(12) United States Patent
Salter et al.

(10) Patent No.: US 10,150,352 B2
(45) Date of Patent: Dec. 11, 2018

(54) ILLUMINATED WINDOW ASSEMBLIES HAVING LIGHT-DIFFUSING ELEMENTS

(71) Applicant: Ford Global Technologies, LLC, Dearborn, MI (US)

(72) Inventors: Stuart C. Salter, White Lake, MI (US); Hongen Tu, Warren, MI (US); Scott Holmes Dunham, Redford, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 15/041,190

(22) Filed: Feb. 11, 2016

(65) Prior Publication Data

US 2017/0232824 A1    Aug. 17, 2017

(51) Int. Cl.
*B60Q 3/208* (2017.01)
*B60J 1/20* (2006.01)
(Continued)

(52) U.S. Cl.
CPC ............... *B60J 1/20* (2013.01); *B60Q 3/208* (2017.02); *F21V 3/00* (2013.01); *F21Y 2115/10* (2016.08)

(58) Field of Classification Search
CPC .... B60Q 3/208; G02B 6/0046; G02B 6/0048; G02B 6/0095; F21V 33/006; G09F 13/18;
(Continued)

(56) References Cited

U.S. PATENT DOCUMENTS

| 5,060,118 A | 10/1991 | Penrod et al. |
| 6,019,411 A | 2/2000 | Carter et al. |

(Continued)

FOREIGN PATENT DOCUMENTS

| CN | 202345586 U | 7/2012 |
| CN | 102881230 A | 1/2013 |

(Continued)

OTHER PUBLICATIONS

Evonik Industries, "Acrylite LED (EndLighten)—Light Guiding Edge Lit Acrylic," Technical Information, obtained from the Internet Jan. 13, 2016, 10 pages, Evonik Cyro LLC, Parsippany, New Jersey, USA.

(Continued)

*Primary Examiner* — Anh Mai
*Assistant Examiner* — Steven Horikoshi
(74) *Attorney, Agent, or Firm* — Price Heneveld LLP; Vichit Chea (57) ABSTRACT

An illuminated window assembly that includes a glass substrate; a light barrier over the substrate having a reflective interior-facing and a tinted exterior-facing surface; a light-diffusing element over the barrier having first and second opposed edges; and an LED source or spaced LED sources configured to direct incident light into the first opposed edge. Further, a thickness of the element at the first opposed edge is greater than a thickness at the second opposed edge. The LED sources can also be directed into both the first and second opposed edges, wherein a thickness of the element at the first and the second opposed edge is greater than a thickness between the opposed edges.

18 Claims, 4 Drawing Sheets

(51) Int. Cl.
*F21V 3/00* (2015.01)
*F21Y 115/10* (2016.01)

(58) Field of Classification Search
CPC .......... F21S 8/204; F21S 19/00; F21S 19/005; E06B 3/66376
See application file for complete search history.

(56) References Cited

U.S. PATENT DOCUMENTS

| | | | |
|---|---|---|---|
| 6,132,072 | A | 10/2000 | Turnbull et al. |
| 6,322,225 | B1* | 11/2001 | Koike ................ G02B 6/0041 362/23.15 |
| 6,631,575 | B1 | 10/2003 | Voelzke et al. |
| 6,666,571 | B2 | 12/2003 | Becher et al. |
| 6,829,852 | B1 | 12/2004 | Uehran |
| 2004/0185195 | A1 | 9/2004 | Anderson et al. |
| 2007/0115673 | A1* | 5/2007 | Chen ................. B62D 25/06 362/459 |
| 2009/0251917 | A1 | 10/2009 | Wollner et al. |
| 2011/0267833 | A1* | 11/2011 | Verrat-Debailleul ........ B32B 17/10036 362/545 |
| 2011/0308693 | A1* | 12/2011 | Van Nutt ............ B32B 17/1022 156/60 |
| 2012/0217881 | A1 | 8/2012 | Sethi et al. |
| 2012/0320621 | A1* | 12/2012 | Kleo ................ B32B 17/10018 362/558 |
| 2014/0096893 | A1 | 4/2014 | Veerasamy |
| 2014/0098557 | A1 | 4/2014 | Veerasamy |
| 2014/0293644 | A1 | 10/2014 | Levinson |
| 2015/0016132 | A1* | 1/2015 | Verrat-Debailleul ........ B60Q 1/268 362/509 |
| 2017/0349094 | A1 | 12/2017 | Salter et al. |

FOREIGN PATENT DOCUMENTS

| | | |
|---|---|---|
| DE | 10343778 A1 | 5/2004 |
| EP | 1903359 A2 | 3/2008 |
| EP | 2003393 B1 | 5/2012 |
| WO | WO 2007077099 A1 * | 7/2007 ............. B32B 17/10 |

OTHER PUBLICATIONS

Evonik Industries, "Acrylite LED (Endlighten)—Acrylic Sheet and Rod for Edge Lighting," Product Information, obtained from the Internet Jan. 13, 2016, 4 pages, Evonik Cyro LLC, Parsippany, New Jersey, USA.

Evonik Industries, "Acrylite LED for High Efficiency Light Delivery," Product Information, copyright 2012, 2 pages, Evonik Cyro LLC, Parsippany, New Jersey, USA.

Evonik Industries, "Acrylite Specialty Lighting Products," Technical Selection Guide, copyright 2014, Evonik Cyro LLC, Parsippany, New Jersey, USA.

* cited by examiner

ILLUMINATED WINDOW ASSEMBLIES HAVING LIGHT-DIFFUSING ELEMENTS

FIELD OF THE INVENTION

The present invention generally relates to vehicular interior lighting, particularly LED-sourced interior lighting provided through windows, sun roofs, moon roofs and other transparent vehicular elements.

BACKGROUND OF THE INVENTION

Vehicular interior lighting, e.g., dome lights, courtesy lights and other roof and side panel interior lighting has generally been realized through the application of conventional, incandescent lighting sources for the past few decades. Although the light produced from incandescent sources is fairly uniform, it is generally accompanied by relatively high heat levels and low intensity compared to more modern light sources (e.g., light-emitting diode, fluorescent, etc.). Further, incandescent light sources have relatively high energy usage compared to more modern light sources.

In the past decade, light emitting diode (LED) sources have been employed in various lighting applications, including vehicular applications. LED sources possess many advantages over conventional lighting sources including but not limited to the ability to transmit high intensity light patterns and generate low heat upon light transmission with very low energy usage. One drawback of LED sources is that the light produced from them is directional and can result in high-contrast, shadowing and other undesirable effects associated with highly directional light. Consequently, in the context of vehicular interior lighting, LED sources have been difficult to use given that the directional nature of the light output from these sources has led to high contrast within the close quarters of the vehicle interior.

Some success has been realized in overcoming the directional nature of the light output from LED sources by coupling certain optics to them. In particular, near-field lens elements, collimators, light-diffusers and reflectors have been coupled to LED sources to shape their light output into uniform patterns approximating those produced by incandescent sources. Unfortunately, many of these solutions require additional packaging (e.g., larger overall lighting source dimensions) and can significantly add cost; consequently, LED sources are not prevalent in vehicular interiors, particularly as replacements to low-cost courtesy and dome lights.

Accordingly, there is a need for vehicular interior lighting solutions that can employ LED sources in a low-cost fashion, with minimal packaging constraints and at low manufacturing costs. Further, as LED sources continue to be integrated within the vehicle industry, there is a desire by many consumers for unique lighting aesthetics that cannot be achieved through conventional sources.

SUMMARY OF THE INVENTION

One aspect of the present invention is to provide an illuminated window assembly that includes a glass substrate; a light barrier over the substrate having a reflective interior-facing and a tinted exterior-facing surface; a light-diffusing element over the barrier having first and second opposed edges; and an LED source configured to direct incident light into the first opposed edge. Further, a thickness of the element at the first opposed edge is greater than a thickness at the second opposed edge.

Another aspect of the present invention is to provide an illuminated window assembly that includes a glass substrate; a light barrier over the substrate having a reflective interior-facing and a tinted exterior-facing surface; a light-diffusing element over the barrier having first and second opposed edges; and a plurality of LED sources configured to direct incident light into the first opposed edge. Further, a thickness of the element at the first opposed edge is greater than a thickness at the second opposed edge.

A further aspect of the present invention is to provide an illuminated window assembly that includes a glass substrate; a light barrier over the substrate having a reflective interior-facing and a tinted exterior-facing surface; a light-diffusing element over the barrier having first and second opposed edges; and LED sources configured to direct incident light into the first and second opposed edges. Further, a thickness of the element at the first and the second opposed edge is greater than a thickness between the opposed edges.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
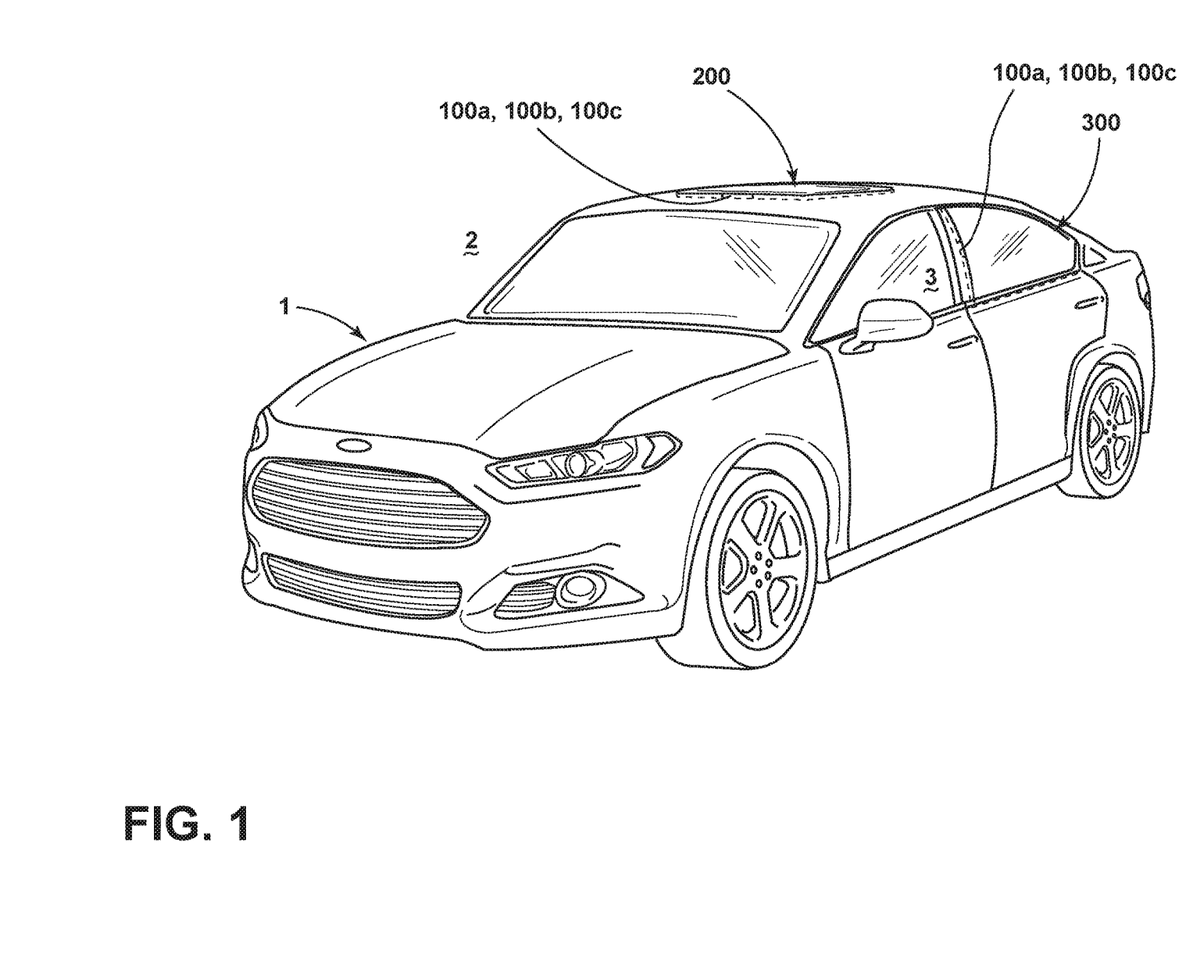
FIG. 1 is an end-on, perspective view of a vehicle containing one or more illuminated window assemblies according to an embodiment.

For purposes of description herein, the terms "upper," "lower," "right," "left," "rear," "front," "vertical," "horizontal," "interior," "exterior," "vehicle forward," "vehicle rearward" and derivatives thereof shall relate to the invention as oriented in FIG. 1. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

LED signal assemblies are being employed today with great practical effect. In the automotive industry, many vehicles now utilize LED-based lighting assemblies, generally in exterior applications (e.g., daytime running lights (DRLs)). Further, these LED-based vehicular assemblies can rely on one or multiple LED light sources, each inherently producing high light intensity with small beam angles. Accordingly, many LED-based lighting assemblies produce "hot spots" of discrete light associated with each LED light source.

What has not been previously understood is how to configure and design LED-based vehicular lighting assemblies to produce highly uniform light for vehicular interior applications, including illuminated window assemblies, illuminated panel assemblies and other compact, illuminated assemblies. As outlined in this disclosure, illuminated window assemblies are provided that employ LED sources with minimal packaging constraints and at low manufacturing costs. These illuminated window assemblies can be employed in various applications with windows including but not limited to vehicular applications, e.g., moon roofs, sun roofs, rear passenger windows and others. The illuminated assemblies of the disclosure can also be employed in other non-window applications having transparent and non-transparent substrates, panels and the like. Further, the illuminated window assemblies of the disclosure can produce light with a desirable aesthetic (e.g., uniform light that emanates from a window) not obtainable through other applications involving discrete LED sources affixed to other vehicular components (e.g., an LED source contained in a fixture affixed to a roof of a vehicle as a conventional dome light).

Referring to FIG. 1, a vehicle 1 is depicted with illuminated window assemblies 100a, 100b and 100c as integrated within a moon roof 200 and rear passenger window 300. In some aspects, illuminated window assemblies 100a-100c can be tinted such that ambient light in the exterior 2 of the vehicle 1 is not substantially transmitted through the illuminated window assemblies 100a-100c into the interior 3 of the vehicle 1. In other aspects, the assemblies 100a-100c can contain minimal tinting, no tinting or otherwise have limited opacity such that ambient light from the exterior 2 can be transmitted through the illuminated window assemblies with little to no loss into the interior 3 of the vehicle 1. When illuminated window assemblies 100a-100c are activated, they transmit a diffuse light pattern into the interior 3 of the vehicle 1 from one or more LED sources contained within, or otherwise coupled to, the assemblies (not shown in FIG. 1) that provides a courtesy light function for the occupants of the vehicle 1. The light patterns produced and transmitted from the illuminated window assemblies 100a-100c emanates from the substrate or substrates within the assemblies themselves. In some aspects, these light patterns produced by the assemblies 100a-100c can also function to provide an interesting lighting aesthetic (e.g., mood lighting) for the occupants of the vehicle.

Figure 2:
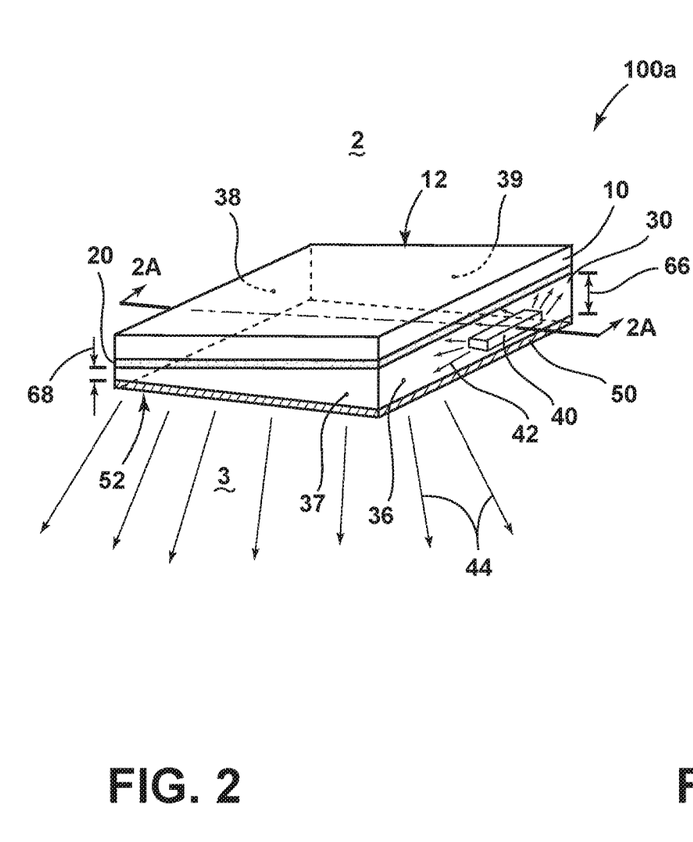
FIG. 2 is a perspective view of an illuminated window assembly employing an LED source according to an embodiment.
Figure 2A:
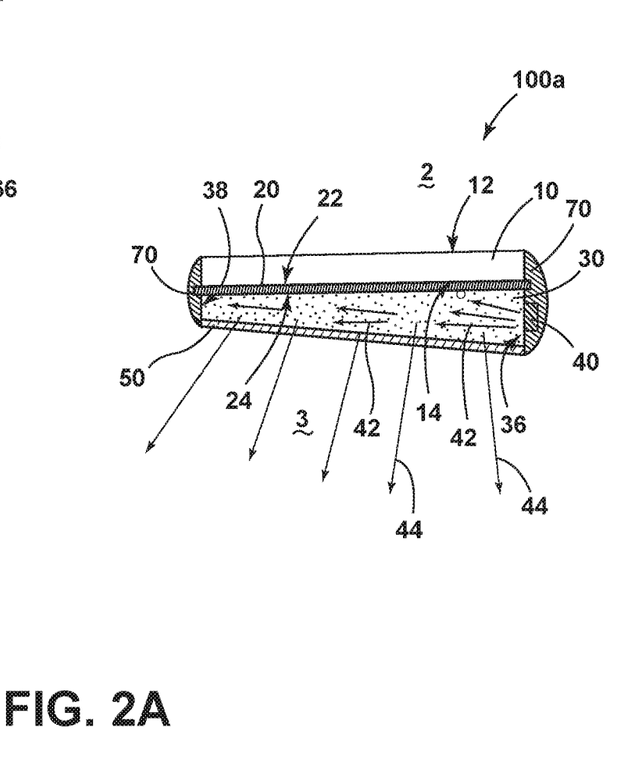
FIG. 2A is cross-sectional view of the illuminated window assembly depicted in FIG. 2.

Referring to FIGS. 2 and 2A, an illuminated window assembly 100a is provided that includes a substrate 10 with an exterior-facing surface 12 and an interior facing surface 14; and a light barrier 20 disposed over the substrate 10. The exterior-facing surface 12 of the substrate 10 faces an exterior 2 of a vehicle, fixture, element, or other structure containing the assembly (not shown). The interior-facing surface 14 of the substrate 10 faces an interior 3 of the structure containing the assembly 100a. As further depicted in FIG. 2A, the light barrier 20 can include a reflective interior-facing surface 24 and a tinted exterior-facing surface 22.

In some aspects of the illuminated window assembly 100a, the substrate 10 is fabricated from a glass or glass-ceramic composition that is processed according to methods (e.g., tempered) suitable for use as a window in a vehicular application. Preferably, the substrate 10 has a composition, and is processed, to achieve high optical transmissivity and transparency with little to no coloration. In some other embodiments of the assembly 100a, the substrate 10 can also be produced with some tinting, particularly in applications of the assembly 100a in which it is frequently exposed to direct sunlight (e.g., a moon roof application). Further, the substrate 10 can range in thickness from about 2 to 8 mm.

As also depicted in FIGS. 2 and 2A, the light barrier 20 can include a tinted exterior-facing surface 22. Preferably, the level of tinting on the exterior-facing surface 22 of the light barrier 20 is configured according to the level of tinting, if any, in the substrate 10. For example, the exterior-facing surface 22 of the light barrier 20 can be configured with little to no tinting in embodiments of the assembly 100a in which the substrate 10 contains an appreciable level of tinting. Conversely, for configurations of the assembly 100a in which the substrate 10 contains little to no tinting (i.e., substrate 10 is substantially transparent), the exterior-facing surface 22 of the light barrier 20 can contain a higher level of tinting. As such, in some embodiments of the assembly 100a, the substrate 10 and light barrier 20 function together to inhibit the transmission of ambient light through the assembly 100a into the interior of the structure incorporating the assembly (e.g., the interior 3 of the vehicle 1 depicted in FIG. 1).

Referring again to FIGS. 2 and 2A, the light barrier 20 includes a reflective interior-facing surface 24. In some embodiments, the reflective interior-facing surface 24 is mirror-like with high specular reflectivity. For example, the reflective interior-facing surface 24 can be a highly-reflective coating applied through vacuum metallization (e.g., a vacuum-metallized chromium coating from Leonhard Kurz Stiftung & Co. KG ("Kurz")). Functionally, the interior-facing surface 24 of the light barrier can serve to reflect incident light from the LED source 40 within the light-diffusing element 30. As the interior-facing surface 24 of the light barrier 20 serves to reflect this light within the light-diffusing element 30, little to no light loss from the LED source 40 occurs through the light barrier 20 to the exterior 2 of the structure containing the assembly 100a.

In the illuminated window assembly 100a depicted in FIG. 2A, the light barrier 20 is disposed over the interior-facing surface 14 of the substrate 10. In some aspects, light barrier 20 is a film, coating or layer deposited directly onto the interior-facing surface 14 of the substrate. In other aspects, the light barrier 20 is a film or layer adhered to the substrate 10 with an adhesive with high optical clarity. Such adhesives used to affix the barrier 20 to the substrate 10 can be transparent or tinted, depending on the level of collective tinting necessary in the substrate 10 and the light barrier 20 for the illuminated window assembly 100a. Further, the light barrier 20 can range in thickness from about 0.0075 mm to 0.25 mm.

Still referring to FIGS. 2 and 2A, the illuminated window assembly 100a further includes a light-diffusing element 30 that is arranged over the light barrier 20. More particularly, the light-diffusing element 30 is disposed over the interior-facing surface 24 of the barrier 20. In certain aspects of the assembly 100a, the element 30 is a film, coating or layer deposited directly onto the interior-facing surface 24 of the light barrier 20. In other preferred aspects, the element 30 is a layer affixed directly to or spaced from the light barrier 20.

More generally, the light-diffusing element 30 has an average thickness that can range from about 0.5 to 5 mm, microns, but locally the thickness of the element 30 can vary as outlined later in this disclosure.

In some aspects, the light-diffusing element 30 is fabricated from an acrylic polymer material containing light-diffusing particles (e.g., ACRYLITE® LED acrylic sheet from Evonik Cryo LLC). In other aspects, the light-diffusing element 30 includes a matrix of substantially transparent polymeric, glass or glass-polymeric material containing light-diffusing particles. These particles can be of similar size, or dissimilar sizes, and at concentrations sufficient to scatter incident light from an LED source within the element 30.

As also depicted in FIGS. 2 and 2A, the light-diffusing element 30 is configured in a rectangular shape. More particularly, the element 30 includes first and second opposed edges 36 and 38 and third and fourth opposed edges 37 and 39, respectively. Further, the illuminated window assembly 100a includes an LED source 40 that is configured to direct incident light 42 into the first opposed edge 36 toward the second opposed edge 38. The incident light 42 travels within the light-diffusing element 30 and scatters off of the light-diffusing particles contained within the element 30. Further, various types of LEDs are suitable for use as the LED source 40 including but not limited to top-emitting LEDs, side-emitting LEDs, and others. The scattered light, which originated from the LED source 40, then exits the light-diffusing element 30 as a scattered light pattern 44 into the interior 3 of the structure containing the illuminated window assembly 100a through the bottom face of the element 30. In other aspects of the window assembly 100a, the LED source 40 is configured to direct incident light 42 into the second opposed edge 38, third opposed edge 37 or fourth opposed edge 39 (see FIG. 2) toward its respective opposed edge (i.e., opposed edge 36, opposed edge 39 or opposed edge 37).

Referring again to FIGS. 2 and 2A, the light-diffusing element 30 can be further defined by a tapered profile. In certain aspects, the thickness 66 at the first opposed edge 36 of the element 30 is greater than the thickness 68 at the second opposed edge 38. Consequently, the thickness of light-diffusing element 30 decreases or otherwise tapers according to a continuous or substantially continuous and constant fashion from the first opposed edge 36 to the second opposed edge 38. The tapered nature of the light-diffusing element 30 serves to significantly improve the uniformity of the scattered light pattern 44 that emanates from the element 30 between the first and second opposed edges 36, 38. The smaller thickness 68 of the element 30 at the second opposed edge 38 away from the LED source 40 (i.e., as compared to the thickness 66 at the first opposed edge 36) serves to offset the higher degree of light loss associated with the incident light 42 at this location compared to other locations within the element 30. That is, light loss associated with the incident light 42 increases as a function of distance from the LED source 40 within the light-diffusing element 30, assuming a constant thickness of the element 30. By reducing the thickness of the element 30 along this same path, the degree of light loss can be offset by the thickness reduction, leading to improved uniformity in the scattered light pattern 44 that emanates from the light-diffusing element 30 into the interior 3 of the structure containing the illuminated window assembly 100a.

Again referring to FIGS. 2 and 2A, other aspects of the illuminated window assembly 100a include a light-diffusing element 30 having a non-continuous or non-constantly changing profile in which the thickness 66 at the first opposed edge 36 is greater than the thickness 68 at the second opposed edge 38. For example, in one embodiment, the thickness of the element 30 changes in a stepped function between the first and second opposed edges 36, 38. In another embodiment, the thickness of the element 30 continuously changes according to a non-linear function between the first and second edges 36, 38.

In other aspects of the illuminated window assembly 100a, the thickness of the light-diffusing element 30 can be varied in more than one direction away from the LED source 40 to obtain a particular light-scattering pattern 44 that emanates from the light-diffusing element 30 into the interior 3 of the structure containing the assembly 100a. For example, an application may require more light transmitted toward the rear of the vehicle relative to the location of the window assembly 100a employed in a moon roof (e.g., the moon roof 200 depicted in FIG. 1) to ensure that the rear passengers have appropriate lighting without disrupting the driver of the vehicle. One approach to ensuring that the assembly 100a produces such a scattered pattern 44 is to increase the thickness of the portion of the element 30 in the vehicle forward direction relative to the portion of the element in the vehicle rearward direction in which the LED source is mounted on an edge of the element on the passenger or driver side of the vehicle. That is, the larger thickness of the element 30 in the vehicle forward direction tends to lead to more light loss in the vehicle forward portion of the element 30, resulting in more light intensity in the scattered light pattern 44 that emanates from the element 30 in the vehicle rearward direction.

Still referring to FIGS. 2 and 2A, the light-diffusing element 30 of the illuminated window assembly 100a can further include a protective film 50 disposed over the surface of the element 30 facing the interior 3 of the structure containing the assembly 100a. Preferably, the protective film 50 has high optical clarity with substantial transparency. For example, the protective film 50 can include a scratch-resistant film (e.g., a fluorosilane coating) that is deposited directly onto the light-diffusing element 30.

Referring again to FIGS. 2 and 2A, the illuminated window assembly 100a can additionally be configured with edge seal 70 that is configured to seal the edges of the substrate 10, light barrier 20 and the light-diffusing element 30. In some aspects, the seal 70 is a thermoset, polymeric material that can be applied with a relatively low viscosity to seal these features (e.g., substrate 10, barrier 20 and element 30) before curing. In other aspects of the illuminated window assembly 100a, the seal 70 is a thermoplastic material that is applied with a relatively low viscosity at an elevated temperature and cooled to seal these features (e.g., substrate 10, barrier 20 and element 30). In certain embodiments, the seal 70 can be formed over these features of the assembly 100a to provide a hermetic and corrosion-resistant seal over them.

Figure 3:
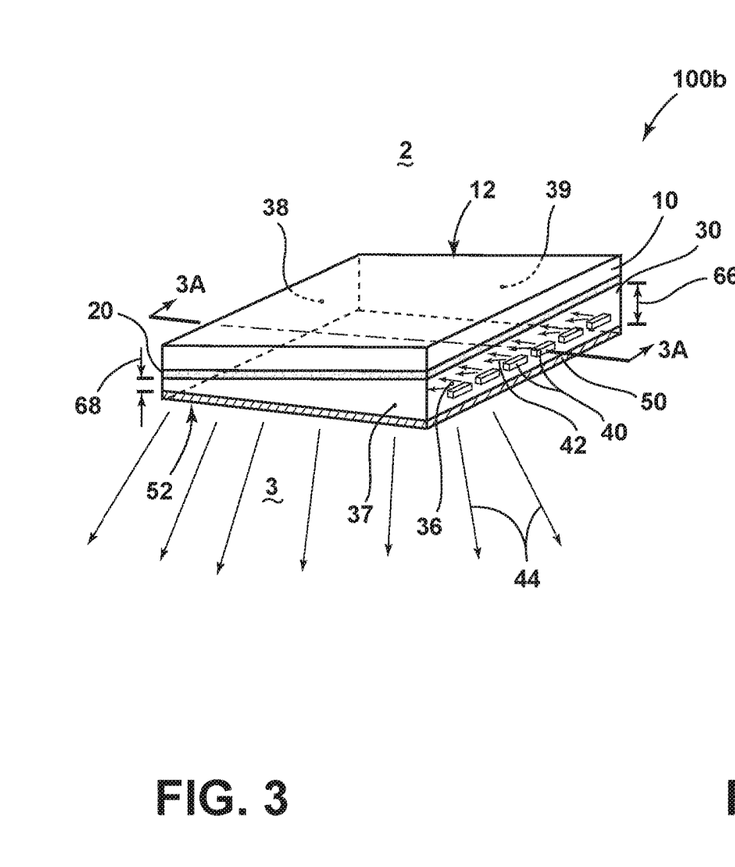
FIG. 3 is a perspective view of an illuminated window assembly employing multiple, spaced LED sources on an edge according to an embodiment.
Figure 3A:
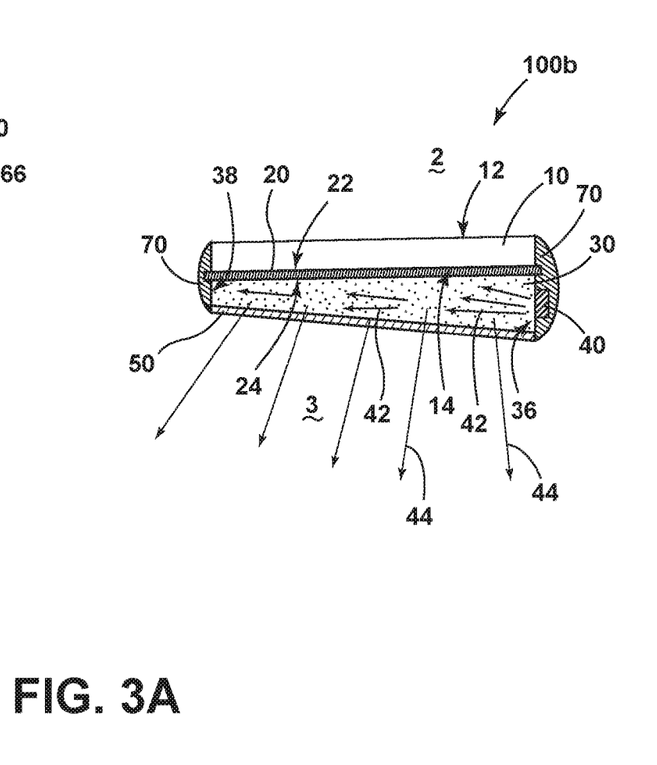
FIG. 3A is cross-sectional view of the illuminated window assembly depicted in FIG. 3.

Referring to FIGS. 3 and 3A, an illuminated window assembly 100b is provided that includes a substrate 10 and a light barrier 20 over the substrate 10 having a reflective interior-facing and a tinted exterior-facing surface 24, 22, respectively. The illuminated window assembly 100b further includes a light-diffusing element 30 over the barrier 20 having first and second opposed edges 36, 38, respectively. In addition, the illuminated window assembly 100b includes a plurality of LED sources 40 configured to direct incident light 42 into the first opposed edge 36. Further, a thickness 66 of the element 30 at the first opposed edge 36 is greater than a thickness 68 at the second opposed edge 38.

In most respects, the illuminated window assembly 100b depicted in FIGS. 3 and 3A is comparable to the illuminated window assembly 100a (see FIGS. 2 and 2A), and like-numbered elements have substantially the same or identical structure and function. Hence, the various embodiments outlined earlier in connection with the illuminated window assembly 100a are equally applicable to the illuminated window assembly 100b depicted in FIGS. 3 and 3A.

The primary difference between the illuminated window assemblies 100a and 100b is that the window assembly 100b includes a plurality of LED sources 40 and the assembly 100a includes an LED source 40. In certain embodiments of the assembly 100b, the LED sources 40 are spaced equally from one another. One advantage of illuminated window assembly 100b is that it can be fabricated with larger dimensions while maintaining high uniformity in its scattered light pattern 44 compared to the illuminated window assembly 100a. For certain applications, the increased cost associated with window assembly 100b relative to assembly 100a is balanced by the improved uniformity in the scattered light pattern 44 that can be achieved by virtue of its plurality of LED sources 40.

In other aspects of the illuminated window assembly 100b depicted in FIGS. 3 and 3A, the plurality of LED sources 40 are spaced with non-constant dimensions. For example, more LED sources 40 on a first opposed edge 36 could be concentrated toward a third opposed edge 37 in the vehicle rearward direction to increase the extent of the scattered light pattern 44 in the vehicle rearward direction to better encompass the rear passengers in a vehicle containing the illuminated window assembly 100a.

Figure 4:
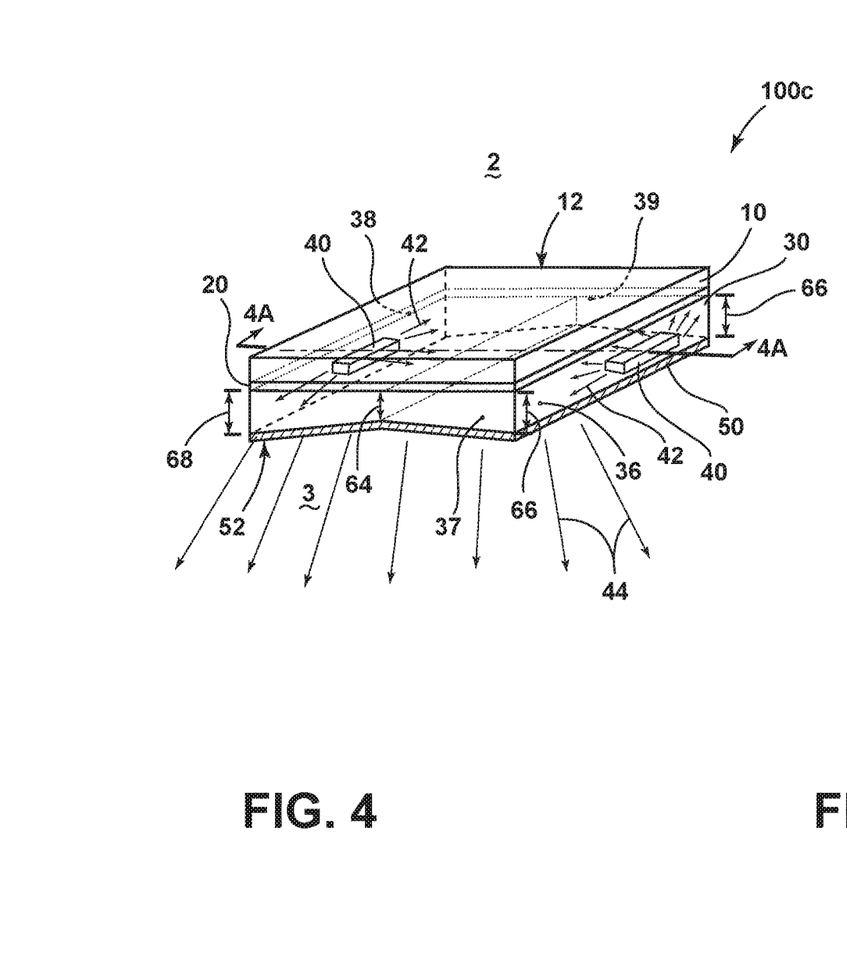
FIG. 4 is a perspective view of an illuminated window assembly employing an LED source on each of two opposing edges according to an embodiment.
Figure 4A:
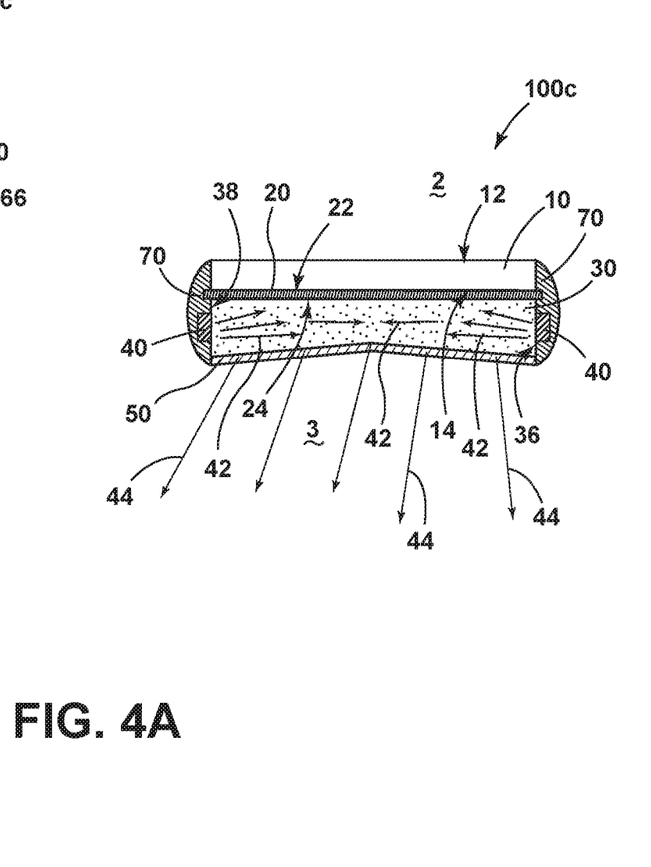
FIG. 4A is cross-sectional view of the illuminated window assembly depicted in FIG. 4.

Now referring to FIGS. 4 and 4A, an illuminated window assembly 100c is provided that includes a substrate 10; and a light barrier 20 over the substrate 10 having a reflective interior-facing and a tinted exterior-facing surface 24, 22, respectively. The illuminated window assembly 100c further includes a light-diffusing element 30 over the barrier 20 having first and second opposed edges 36, 38. In addition, the illuminated window assembly 100c includes LED sources 40 configured to direct incident light 42 into the first and second opposed edges 36, 38. Further, a thickness 66, 68 of the element 30 at the first and the second opposed edges 36, 38, respectively, is greater than a thickness 64 between the opposed edges 36, 38.

In most respects, the illuminated window assembly 100c depicted in FIGS. 4 and 4A is comparable to the illuminated window assemblies 100a and 100b (see FIGS. 2, 2A, 3 and 3A), and like-numbered elements have substantially the same or identical structure and function. Hence, the various embodiments outlined earlier in connection with the illuminated window assemblies 100a and 100b are equally applicable to the illuminated window assembly 100c depicted in FIGS. 4 and 4A.

The primary difference between the illuminated window assembly 100c depicted in FIGS. 4 and 4A and the illuminated window assemblies 100a and 100b (see FIGS. 2, 2A, 3 and 3A) is that the assembly 100c includes an LED source 40 on each of two opposed edges 36, 38. In other embodiments of the assembly 100c, an LED source 40 is located on each of two opposed edges 37, 39. One advantage of the illuminated window assembly 100c is that it can be fabricated with larger dimensions while maintaining high uniformity in its scattered light pattern 44 compared to the illuminated window assemblies 100a and 100b. In view of its configuration with an LED source 40 on each of the opposed edges 36, 38, the assembly 100c can be fabricated with a greater width dimension between the opposed edges 36, 38. For certain applications, the increased cost associated with window assembly 100c relative to assembly 100a is balanced by the improved uniformity in the scattered light pattern 44 that can be achieved by virtue of its use of LED sources 40 on each of two of its opposed edges with an increased footprint.

With regard to illuminated window assemblies 100a, 100b and 100c, they can possess any of a variety of shape factors. That is, they are not limited to the rectangular shape depicted in exemplary form in FIGS. 2, 2A, 3, 3A, 4 and 4A. For example, an illuminated window assembly 100a ca be fabricated in an elliptical or circular shape, with an LED source 40 at a particular location on the circumference of the light-diffusing element 30. Similarly, an illuminated window assembly 100c can be fabricated in an elliptical or circular shape with an LED source or sources 40 at two opposite positions on the circumference of the light-diffusing element 30. As another example, an illuminated window assembly 100b can be fabricated in a rectangular shape with a large aspect ratio (e.g., an aspect ratio >5:1) such that the plurality of LED sources are located on one long edge (e.g., first opposed edge 36) of the light-diffusing element 30.

Illuminated window assemblies 100a, 100b, 100c can also possess outer curvature or other exterior shape factors in addition to a flat, parallel outer surface. When assemblies 100a, 100b and 100c possess such curvature, each of the features of the assembly typically exhibit the same or similar curvature (e.g., substrate 10, light barrier 20, light-diffusing element 30, etc.). For example, illuminated window assemblies 100a, 100b and 100c can be integrated within a vehicle (e.g., vehicle 1 as depicted in FIG. 1) and configured with a curvature to match the exterior curvature of the vehicle at the location of the moon roof (e.g., at the moon roof 200 in FIG. 1), rear passenger side window (e.g., at the window 300 in FIG. 1) or other aspect of the vehicle containing the assembly.

According to certain aspects of the illuminated window assemblies 100a, 100b and 100c, one or more edges of the light-diffusing element 30 can be configured with highly reflective, specular surfaces, coatings or treatments in a direction or directions facing one or more LED source or sources 40. That is, edges of the light-diffusing element 30 facing an LED source or sources 40 can be configured with these reflective surfaces or treatments to ensure that light loss of incident light 42 from the LED source or sources 40 is minimized through theses edges to further maximize the intensity and uniformity of the scattered light pattern 44.

Other embodiments of the window assemblies 100a, 100b and 100c are configured with various positional relationships between the LED source or sources 40 and the edges of the light-diffusing element 30. Depending on the type of LED source employed for the LED source or sources 40, the incident light 42 can vary in terms of its spread or beam angle. Preferably, the distance between the LED source or sources 40 is minimized to ensure that all or most of the incident light 42 enters the light-diffusing element 40 with minimal loss above and/or below the element 30. Nevertheless, other embodiments of the assemblies 100a, 100b and 100c can be configured with a finite spacing between the LED source or sources 40 and edges of the light-diffusing element 30 to minimize internal reflection of the incident light 42 off of the interior-facing surface 24 of the light barrier 20 to reduce light loss (and thus increase efficiency).

It should also be understood that illuminated window assemblies 100a, 100b and 100c depicted in FIGS. 2, 2A, 3, 3A, 4 and 4A can be controlled with various schemes and arrangements as understood by those in the operative field.

For example, the LED source or sources 40 of these assemblies can be coupled to a power source, controller and switch (not shown). As desired, an occupant of a vehicle 1 containing any of these assemblies can activate the switch to an "ON" position to cause the LED source or sources 40 to direct incident light 42 within the assembly that ultimately emanates from the assembly as a scattered light pattern 44 within the vehicle. When no illumination is desired, the occupant can then move the switch to an "OFF" position to cease transmission of incident light 42 from the LED source or sources 40 within the assembly. In this state, the window assembly can then transmit light through the substrate 10, light-barrier 20 and light-diffusing element 30, depending on the application employing the assembly (e.g., sun roof 200, rear passenger side window 300, etc.).

Referring again to illuminated window assemblies 100a, 100b and 100c, these assemblies can be fabricated according to various methods and sequences. In one exemplary method, a light barrier (e.g., a vacuum-metallized film from Kurz serving as a light barrier 20) is formed with a vacuum metallization process within a mold, and then a light-diffusing element (e.g., a light-diffusing element 30 fabricated from an ACRYLITE® LED film) is insert-molded onto the barrier. The light barrier/light-diffusing element sandwich is then joined to a substrate (e.g., a glass substrate 10 suitable for an automobile window) with a spray adhesive (e.g., 3M™ Optically Clear Adhesive 8172). After the substrate, light barrier and light-diffusing element are joined, an optical protective coating (e.g., a silane-based optical, scratch-resistant coating or film) can be applied to the interior-facing side of the light-diffusing element. Next, the substrate, light barrier and light-diffusing element can be sealed at the edges of the assembly with a silicone overmold or other type of sealing material. Upon completion of the sealing step, the completed illuminated window assembly 100a, 100b or 100c can be installed into a structure, vehicle or other device, depending on its intended application.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

Variations and modifications can be made to the aforementioned structure without departing from the concepts of the present invention. For example, the illuminated assemblies of the disclosure are not limited to window applications. These assemblies could be installed within a panel or roof feature of a vehicle with the substrate 10 fabricated from the same materials or elements serving as the panel or roof. That is, the assemblies could be fabricated and joined within a roof panel or side panel section of the vehicle. Such assemblies can produce a desirable scattered light pattern 44 in a smaller depth footprint than many conventional interior, vehicle lights (e.g., incandescent-based dome and courtesy lights). Such embodiments, and other embodiments understood by those with skill in the field within the scope of the disclosure, are intended to be covered by the following claims unless these claims by their language expressly state otherwise.

What is claimed is:

1. An illuminated window assembly, comprising:
    a glass substrate;
    a metal light barrier contacting the substrate having a reflective interior-facing and a tinted exterior-facing surface;
    a light-diffusing element contacting the barrier having first and second opposed edges;
    a fluorosilane coating contacting the element; and
    an LED source configured to direct incident light into the first opposed edge,
    wherein a thickness of the element at the first edge is greater than a thickness at the second edge.

2. The window assembly according to claim 1, wherein the light-diffusing element comprises an acrylic polymer matrix and light-diffusing particles.

3. The window assembly according to claim 1, wherein the assembly is configured as a roof window for a vehicle to selectively emanate a light pattern into the vehicle derived from the incident light directed into the first opposed edge of the light-diffusing element.

4. The window assembly according to claim 1, wherein the assembly is configured as a side window for a vehicle to selectively emanate a light pattern into the vehicle derived from the incident light directed into the first opposed edge of the light-diffusing element.

5. The window assembly according to claim 1, further comprising:
    an edge seal comprising a polymeric material that is configured to seal the edges of the glass substrate, light barrier and light-diffusing element.

6. The window assembly according to claim 1, wherein the thickness of the light-diffusing element is tapered across the element between the first and second opposed edges.

7. An illuminated window assembly, comprising:
    a glass substrate;
    a metal light barrier contacting the substrate having a reflective interior-facing and a tinted exterior-facing surface;
    a light-diffusing element contacting the barrier having first and second opposed edges;
    a fluorosilane coating contacting the element; and
    a plurality of spaced LED sources configured to direct incident light into the first opposed edge,
    wherein a thickness of the element at the first opposed edge is greater than a thickness at the second opposed edge.

8. The window assembly according to claim 7, wherein the light-diffusing element comprises an acrylic polymer matrix and light-diffusing particles.

9. The window assembly according to claim 7, wherein the assembly is configured as a roof window for a vehicle to selectively emanate a light pattern into the vehicle derived from the incident light directed into the first opposed edge of the light-diffusing element.

10. The window assembly according to claim 7, wherein the assembly is configured as a side window for a vehicle to selectively emanate a light pattern into the vehicle derived from the incident light directed into the first opposed edge of the light-diffusing element.

11. The window assembly according to claim 7, further comprising:
    an edge seal comprising a polymeric material that is configured to seal the edges of the glass substrate, light barrier and light-diffusing element.

12. The window assembly according to claim 7, wherein the thickness of the light-diffusing element is tapered across the element between the first and second opposed edges.

13. An illuminated window assembly, comprising:
- a glass substrate;
- a metal light barrier contacting the substrate having a reflective interior-facing and a tinted exterior-facing surface;
- a light-diffusing element contacting the barrier having first and second opposed edges;
- a fluorosilane coating contacting the element; and
- LED sources configured to direct incident light into the first and second opposed edges,
- wherein thicknesses of the element at the first opposed edge and the second opposed edge are greater than a thickness of the light-diffusing element between the opposed edges.

14. The window assembly according to claim 13, wherein the light-diffusing element comprises an acrylic polymer matrix and light-diffusing particles.

15. The window assembly according to claim 13, wherein the assembly is configured as a roof window for a vehicle to selectively emanate a light pattern into the vehicle derived from the incident light directed into the first and second opposed edges of the light-diffusing element.

16. The window assembly according to claim 13, wherein the assembly is configured as a side window for a vehicle to selectively emanate a light pattern into the vehicle derived from the incident light directed into the first and second opposed edges of the light-diffusing element.

17. The window assembly according to claim 13, further comprising:
- an edge seal comprising a polymeric material that is configured to seal the edges of the glass substrate, light barrier and light-diffusing element.

18. The window assembly according to claim 13, wherein the thickness of the light-diffusing element is tapered across the light-diffusing element from the first opposed edge to a central location between the opposed edges and across the light-diffusing element from the second opposed edge to the central location.

* * * * *